(12) United States Patent
Degler et al.

(10) Patent No.: US 8,042,667 B2
(45) Date of Patent: Oct. 25, 2011

(54) HYDRODYNAMIC TORQUE CONVERTER DEVICE FOR AN AUTOMOTIVE DRIVE TRAIN

(75) Inventors: Mario Degler, Baden-Baden (DE); Stephan Maienschein, Baden-Baden (DE); Jan Loxtermann, Baden-Baden (DE); Thorsten Krause, Buehl (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 428 days.

(21) Appl. No.: 12/084,837

(22) PCT Filed: Oct. 21, 2006

(86) PCT No.: PCT/DE2006/001873
§ 371 (c)(1),
(2), (4) Date: May 9, 2008

(87) PCT Pub. No.: WO2007/054061
PCT Pub. Date: May 18, 2007

(65) Prior Publication Data
US 2009/0139816 A1    Jun. 4, 2009

(30) Foreign Application Priority Data
Nov. 10, 2005   (DE) .......................... 10 2005 053 597

(51) Int. Cl.
*F16H 45/02* (2006.01)
(52) U.S. Cl. .................... 192/3.3; 192/70.17; 192/213.2
(58) Field of Classification Search .................... None
See application file for complete search history.

(56) References Cited

U.S. PATENT DOCUMENTS

| 5,211,270 A * | 5/1993 | Tamura et al. | 192/3.29 |
| 5,713,442 A * | 2/1998 | Murata et al. | 192/3.29 |
| 2004/0226794 A1* | 11/2004 | Sasse et al. | 192/3.29 |
| 2005/0115788 A1* | 6/2005 | Ackermann et al. | 192/3.29 |

FOREIGN PATENT DOCUMENTS

| DE | 10358901 A1 | 2/2005 |
| EP | 1528289 A2 | 10/2004 |

* cited by examiner

*Primary Examiner* — David D Le
*Assistant Examiner* — Jacob S Scott
(74) *Attorney, Agent, or Firm* — Simpson & Simpson, PLLC (57) ABSTRACT

A hydrodynamic torque converter device comprising a torsional vibration damper, an impeller, a turbine, a stator, and a converter lockup clutch. The torsional vibration damper has first and second energy accumulating devices with one or more first energy accumulators, and second energy accumulators, respectively. The converter lockup clutch and the first and second energy accumulating devices are connected in series. The turbine has an outer shell that is rotationally fixed to an intermediate part between the first and second accumulating devices. An input element of the first energy accumulating device is used to transmit torque via the lockup clutch for loading the first energy accumulating device. The input element of the first energy accumulating device has at least one lug having a free end and a non-free end, with the non-free end of the lug radially inside the free end of the lug.

9 Claims, 6 Drawing Sheets

HYDRODYNAMIC TORQUE CONVERTER DEVICE FOR AN AUTOMOTIVE DRIVE TRAIN

CROSS-REFERENCE TO RELATED APPLICATIONS

This application is the National Stage of PCT International Application No. PCT/DE2006/001873, filed Oct. 21, 2006, which application published in German and is hereby incorporated by reference in its entirety, which application claims priority from German Patent Application No. DE 10 2005 053 597.6, filed Nov. 10, 2005 which is incorporated by reference in its entirety.

FIELD OF THE INVENTION

The invention relates to a hydrodynamic torque converter device for a motor vehicle drive train, comprising a torsion vibration damper and a converter torus formed by a pump shell, a turbine shell, and a stator shell, and comprising a converter lockup clutch.

BACKGROUND OF THE INVENTION

FIG. 4 of German Patent No. DE 103 58 901 A1 shows a hydrodynamic torque converter device for a motor vehicle drive train comprising a torsion vibration damper comprising two energy accumulator means, thus spring means, connected in series, and a converter torus formed by a pump shell, a turbine shell, and a stator shell, and a converter lockup clutch.

With reference to the radial direction of the rotation axis of the torsion vibration damper, the two energy accumulator means are radially offset from one another, so that one of these energy accumulator means forms an inner energy accumulator means and the other one forms an outer energy accumulator means. In the moment flow between the two energy accumulator means, an intermediary component is disposed, which is non-rotatably connected to the turbine dish of the converter torus, wherein the intermediary component in this configuration forms the output component of the outer energy accumulator means and the input component of the inner energy accumulator means.

The converter lockup clutch comprises an axially movable piston, which is provided with a friction liner on its side, facing the converter housing, so that it can be pressed against the converter housing for closing the converter lockup clutch. The piston, thus, simultaneously forms an input component of the radially exterior energy accumulator means and comprises actuation elements for loading the energy accumulators of the outer energy accumulator means.

The actuation elements initially extend with reference to the axial direction of the torsion vibration damper formed by the rotation axis of the torsion vibration damper axially offset to the outer energy accumulator means into radially external portions of the energy accumulators, where they form elbows and subsequently extend with a respective inclination to the radial inside into the portion of the energy accumulator front face, for whose respective loading they are provided. With reference to FIG. 4 of DE 103 58 901 A1, these actuation elements thus extend respectively from the radial outside or from the top to the respective face side of the respective energy accumulator of the outer energy accumulator means.

FIGS. 5 and 6 of DE 103 58 901 A1 show hydrodynamic torque converter devices in which the actuation elements are formed at an input component of the outer energy accumulator means, which is non-rotatably connected to a piston of the type through pinions and wherein the actuation elements extend with reference to the rotation axis of the torsion vibration damper axially in the radial center of the respective energy accumulator means of the outer energy accumulator means to the respective face side of the energy accumulator, which can be loaded by the respective control element. Thus, the control elements extend in the radial center with reference to FIGS. 5 and 6 of DE 103 58 901 A1, or from the side to the respective face side of the respective exterior energy accumulator.

Thus, it is the object of the invention to provide a hydrodynamic torque converter device for a motor vehicle drive train, comprising a torsion vibration damper and a converter torus formed by a pump shell, a turbine shell, and a stator shell, and comprising a converter lockup clutch, wherein the hydrodynamic torque converter device is simple to manufacture and facilitates the safe compensation of rotational spikes of a combustion engine, when integrated into a motor vehicle drive train, or facilitates only a minor transfer in the direction towards the drive axle(s) of the motor vehicle.

BRIEF SUMMARY OF THE INVENTION

The present invention is a hydrodynamic torque converter device for a motor vehicle drive train, comprising a torsion vibration damper, a converter torus formed by a pump shell, a turbine shell, and a stator shell, and a converter lockup clutch.

It is appreciated thus that a means designated as "converter torus" in the previous publications is partially designated as "hydrodynamic torque converter". The term of the "hydrodynamic torque converter" however, is partially also used for devices in previous publications, which comprise a torsion vibration damper, a converter lockup clutch, and a means formed by a pump shell, a turbine shell, and a stator shell, a converter torus in the language of the present disclosure. In view of this, the terms "hydrodynamic torque converter device" and "converter torus" are used in the present disclosure for better identification.

The torsion vibration damper comprises a first energy accumulator means and a second energy accumulator means. The first energy accumulator means comprises one or several first energy accumulators and the second energy accumulator means comprises one or several second energy accumulators. The converter lockup clutch, the first energy accumulator means, and the second energy accumulator means are connected in series. It is thus provided that when the converter lockup clutch is closed, the first energy accumulator means is disposed in the torque flow between the converter lockup clutch and the second energy accumulator means.

Between the first energy accumulator means and the second energy accumulator means, at least one intermediary component or first component is provided, which is connected in series with the two energy accumulator means. Thus, it is provided that a torque, which may be transferred by the converter lockup clutch, when the converter lockup clutch is closed, can be transferred by the first energy accumulator means to the at least one intermediary component or first component and can be transferred by this intermediary component or first component through the second energy accumulator means in the direction of the output side of the hydrodynamic torque converter device.

The turbine shell of the converter torus comprises an outer turbine shell. The outer turbine shell is, e.g., non-rotatably coupled to the intermediary component or to the first component, e.g., by several driver components non-rotatably coupled amongst each other, or by one driver component. It can, however, also be provided that such a driver component or a section or extension of the outer turbine shell forms the intermediary component or the first component or one of several intermediary components or first components, by which torque can be transferred from the first energy accumulator means to the second energy accumulator means at least when the torque converter lockup clutch is closed. It can furthermore be provided that the outer turbine shell or an extension of the outer turbine shell forms the intermediary component or one intermediary component, or first component, through which torque can be transferred from the first energy accumulator means to the second energy accumulator means, at least when the torque converter lockup clutch is closed.

Furthermore, an input component of the first energy accumulator means is provided. By the input component of the first energy accumulator means or through the input component of the energy accumulator means, a transferable torque can be transferred by the torque converter lockup clutch, when the torque converter lockup clutch is closed, to the first energy accumulator means for loading the first energy accumulator means. The input component of the first energy accumulator means comprises, respectively, at least one ear forming a free end and a non-free end for loading a respective face side of a respective first energy accumulator. It is thus also provided in particular that the input component for each first energy accumulator of the first energy accumulator means comprises one or at least one ear, by which the respective energy accumulator can be loaded on the input side or on the input side of the first energy accumulator means.

The respective non-free end of a respective ear is disposed radially within the free end of the respective ear with reference to the radial direction of the rotation axis of the torsion vibration damper.

In a preferred embodiment, the free end and the non-free end of an ear of the input component of the first energy accumulator means, provided for loading a first energy accumulator of a first energy accumulator means, are disposed so that a straight connection line extending through the free end, through any point or the center of the free end and the non-free end, through any point, or through the center point of the non-free end, encloses an angle with a straight line extending in radial direction relative to the rotation axis of the torsion vibration damper, which has an absolute value of less than 70°, preferably less than 60°, preferably less than 50°, preferably less than 40°, preferably than 30°, preferably less than 20°, and most preferably less than 10°. This applies preferably for each ear of the input component of the first energy accumulator means, provided with a free end and with a non-free end, and provided for loading a respective front face or front side of a respective first energy accumulator of the first energy accumulator means.

It is thus provided in particular that at least one ear of the first input component of the first energy accumulator means provided for loading a in particular input side front face, or front side of a first energy accumulator of the first energy accumulator means extends, so that the projection of the ear into a projection plane defined by the face side intersects the outer circumference of the face side projected into the projection plane at least once. It can thus be provided that the outer circumference of the face side is disposed in the projection plane anyhow, so that the projected outer circumference is identical to the non-projected outer circumference, or that the outer circumference is at least partially disposed outside of the projection plane, which can, e.g., be the case when the front face or front side is not, or not exactly disposed in a plane. For simplification purposes, the terms "projected outer circumference" and "projected ear" are used, wherein the projections relate to the projection plane. Since the projected ear intersects the projected outer circumference of the face surface or face side in the projection plane at least once, the projected outer circumference and the projected ear form one or several intersection lines in the projection plane. This occurs in particular in the case, when the projected ear intersects the projected outer circumference of the face surface or face side exactly once in the projection plane, the projected outer circumference and the projected ear forming exactly one intersection line in the projection plane, and in the case when the projected ear intersects the projected outer circumference of the front face or front side several times in the projection plane, the projected outer circumference and the projected ear forming several intersection lines in the projection plane, which extend along the projected outer circumference of the front face or front side, extending offset from one another or overlapping or abutting to one another. Thus, an intersection line exists in the case, where as described, only one intersection line is formed, and also in the case, where several intersection lines are formed, wherein the intersection line is generated by the projected ear, intersecting the projected outer circumference for the first time along its extension, viewed from its non-free end to its free end, and wherein the intersection line is designated herein as the first intersection line for better identification and for simplified reference. The first intersection line is disposed in the projection plane with reference to the radial direction of the rotation axis of the torsion vibration damper in a radially inward portion of the respective first energy accumulator and thus in particular in its entirety. The first intersection line is disposed radially within the center force effect line of the respective first energy accumulator with reference to the radial direction of the torsion vibration damper, or radially within the point, at which the center force effect line intersects the projection plane and in particular in its entirety.

The outer circumference of the face side of the first energy accumulator is preferably a circumference defining the face side radially to the outside with reference to the advantageously provided radial direction of the face side.

In an advantageous improvement, each ear of the input component of the first energy accumulator means provided for loading a respective, in particular respectively input side face surface or -side of a respective first energy accumulator of the first energy accumulator means extends in the manner, wherein thus the projected outer circumference of the face surface or -side of the first energy accumulator, or this face surface or -side belongs to the respective first energy accumulator, which can be loaded by the respective ear. This accordingly applies also to the improvements and the improving features described therein, which thus can or shall relate to an ear, or in particular with reference to the respectively associated first energy accumulator, which can be loaded by the respective ear, to all ears of the input component of the first energy accumulator means.

It is appreciated that the projections are in particular projections perpendicular to the respective projection plane, or projections, which are substantially projected into the projection plane along imaginary circles extending concentric about the rotation axis of the torsion vibration damper.

According to a preferred improvement, the first intersection line is disposed in particular completely in the projection plane with reference to the radial direction of the rotation axis of the torsion vibration damper, in a radially inner portion of the respective first energy accumulator, so that the first intersection line is disposed in the projection plane with reference to the radial direction of the rotation axis of the torsion vibration damper radially within the center force effect line of the first energy accumulator, or radially within the point, where the force effect line intersects the projection plane, and thus within a portion extending mirror symmetrical about a radial straight line extending through the force effect line, or the respective point, which covers viewed in circumferential direction of the projected face surface or -side maximally 140°, preferably maximally 120°, preferably maximally 100°, preferably maximally 80°, preferably maximally 60°, and most preferably maximally 20°.

In a preferred embodiment, the first energy accumulator means comprises first energy accumulators, which are distributed, or spaced apart along the circumference with reference to the circumferential direction of the rotation axis of the torsion vibration damper. Such first energy accumulators can, e.g., be configured as coil springs, or as arc springs or as straight compression springs. The first energy accumulator can thus be in particular a first spring means. It is furthermore preferred that the second energy accumulator, which is, e.g., a second spring means, comprises a plurality second energy accumulators, which are with reference to the circumference direction of the rotation axis of the torsion vibration damper disposed distributed and/or spaced apart along the circumference. The second energy accumulators are coil springs in an advantageous embodiment, or straight compression spring or arc springs. In a particularly preferred embodiment, the first energy accumulators are arc springs and the second energy accumulators are straight compression springs.

In a particularly preferred embodiment, one or the respective ear of the input component extends so that it comprises a section between its non-free end and its free end, in which it extends straight. It can, e.g., be provided that the ear comprises such a section in its projection into the projection plane in the portion defined or enclosed by the projected outer circumference of the face surface loaded by it, wherein the ear extends in a straight line in the section. The straight section can, e.g., extend in radial direction with reference to the radial direction of the rotation axis of the torsion vibration damper and in particular, so that its projection into the projection plane extends therein through the center force effect line, or through the point or through the intersection point, formed by the force effect line and the projection plane.

In a particularly useful configuration, such straight section of the ear extends to the free end of the ear. It can be provided in particular also in ears forming a straight section, that a connection path, which connects a point of the first intersection line with a point of the free end of the respective ear in the projection plane, encloses an angle with a straight line, extending radially with reference to the radial direction of the rotation axis of the torsion vibration damper, through the center force effect line of the respective first energy accumulator or through the intersection point formed by the force effect line in the projection plane, wherein the angle is less than 50°, preferably less than 40°, preferably less than 30°, preferably less than 20°, and most preferably less than 10°.

In a particularly preferred embodiment, the respective ear of the input component of the first energy accumulator means extends, so that it can load the face surface with reference to the radial direction of the face surface of the first energy accumulator in radially substantially opposed, radially substantially exterior portions of the face surface, in particular engaging respectively therein. It is provided that the torsion vibration damper is rotatable about a rotation axis.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
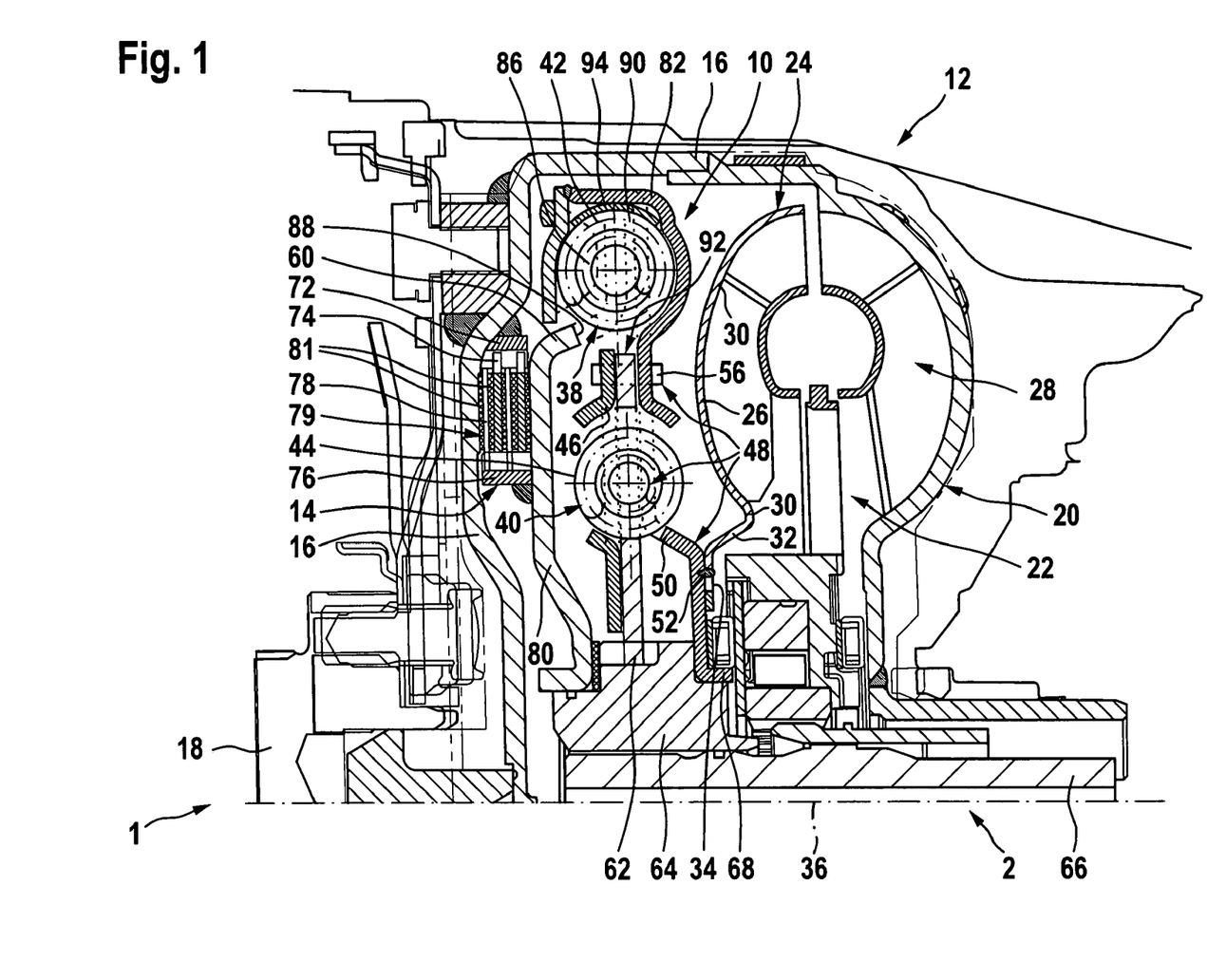
FIG. 1 is a partial, cross-sectional view of a first embodiment of a hydrodynamic torque converter device of the present invention.
Figure 1A:
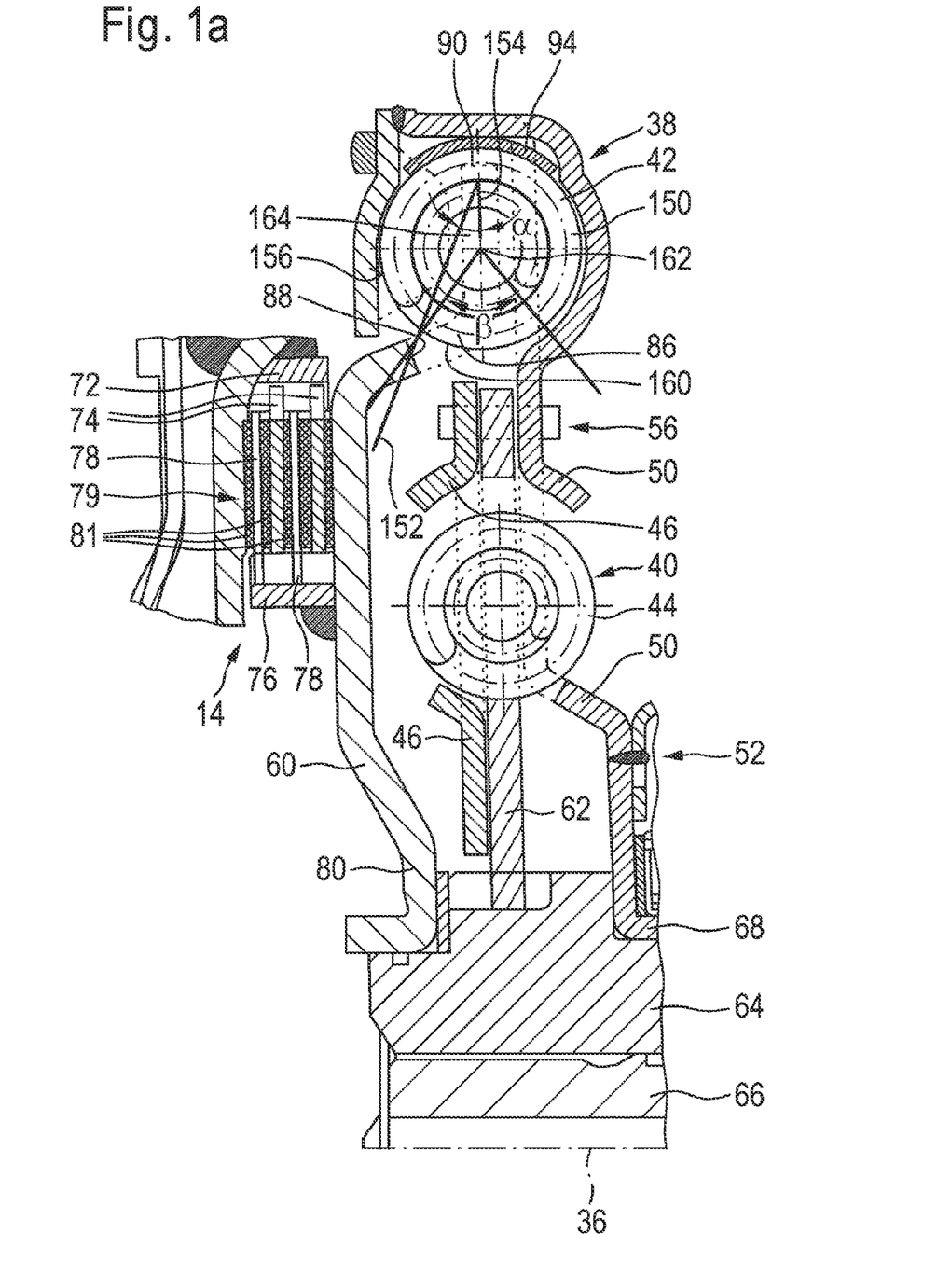
FIG. 1a is an enlarged view of a portion of FIG. 1.
Figure 2:
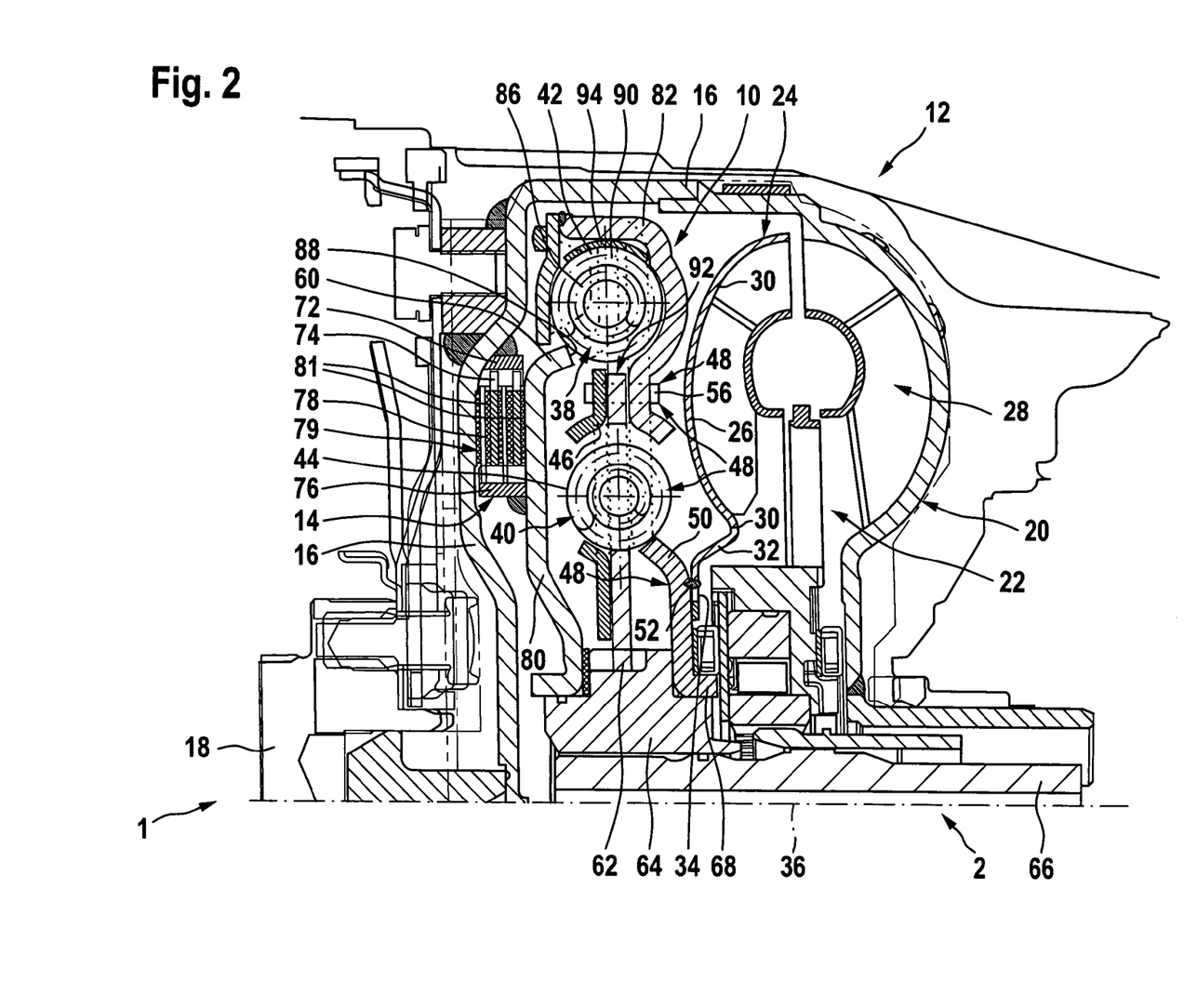
FIG. 2 is a partial, cross-sectional view of a second embodiment of the hydrodynamic torque converter device.
Figure 2A:
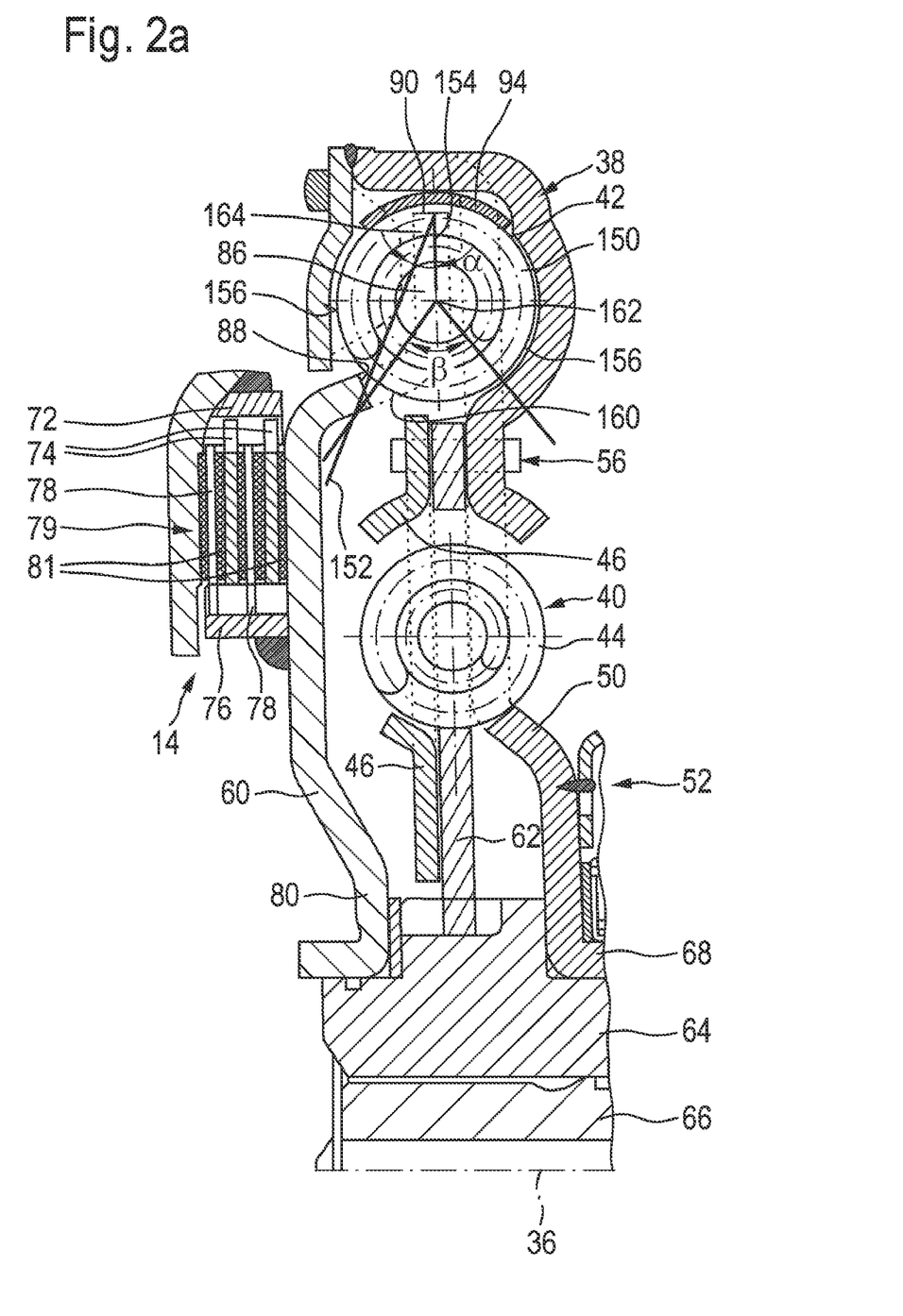
FIG. 2a is an enlarged view of a portion of FIG. 2.
Figure 3:
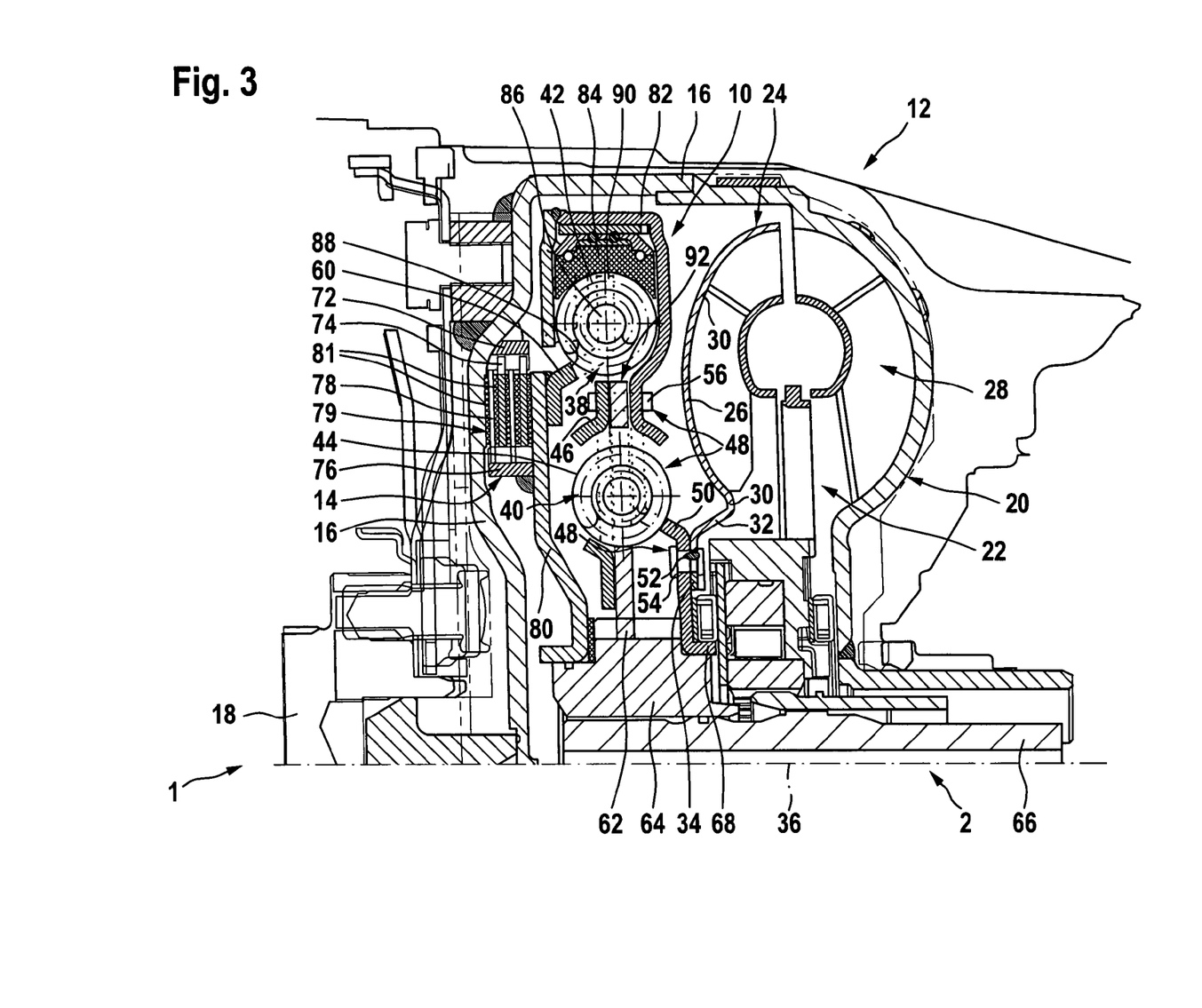
FIG. 3 is a partial, cross-sectional view of a third embodiment of the hydrodynamic torque converter device; and, FIG. 3a is an enlarged view of a portion of FIG. 3.
Figure 3A:
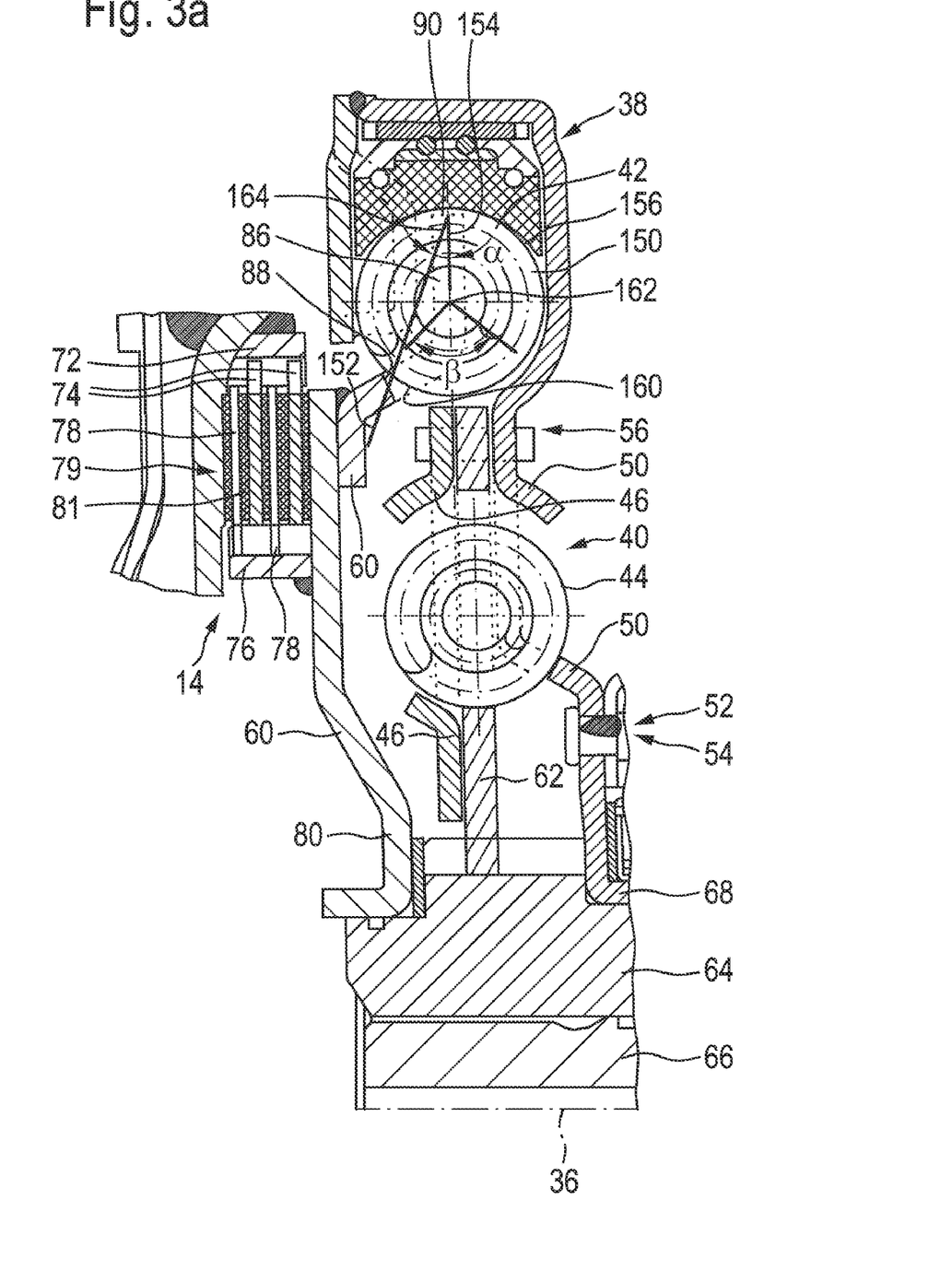

FIGS. 1, 2, and 3 show various embodiments of hydrodynamic torque converter device 1 according to the invention. FIGS. 1a, 2a, and 3a, respectively, show an enlarged view of a portion of FIGS. 1, 2, and 3, respectively.

Hydrodynamic torque converter device 1 is intended for a drive train of a motor vehicle or forms a component of a drive train of a motor vehicle, which is schematically emphasized by the reference numeral 2. Hydrodynamic torque converter device 1 comprises torsion vibration damper 10, converter torus 12 formed by pump shell 20, turbine shell 24, and stator shell 22, and it comprises converter lockup clutch 14. Torsion vibration damper 10, converter torus 12, and converter lockup clutch 14 are received in converter housing 16. Converter housing 16 is connected in a substantially non-rotatable manner to drive shaft 18 combustion engine, which can, e.g., be the crank shaft or the engine output shaft of a combustion engine.

As discussed, converter torus 12 comprises a pump or pump shell 20, stator shell 22, and turbine or turbine shell 24, which interact in a known manner. In a known manner converter torus 12 comprises converter torus cavity or torus interior 28, which are provided for receiving oil, or an oil flow through. Turbine shell 24 comprises turbine dish 26, which forms wall section 30 directly abutting to converter interior 28 and defining converter interior 28. Subsequent to wall section 30 directly abutting to torus interior 28, extension 32 of turbine dish 26 adjoins. Extension 32 comprises straight or annular section 34. Straight section 34 of extension 32 can be provided, so that it is substantially straight in radial direction of rotation axis 36 of torsion vibration damper 10 and so that it is disposed in particular as an annular section in a plane disposed perpendicular to rotation axis 36 or establishes the plane.

Torsion vibration damper 10 comprises first energy accumulator means 38, which is provided in particular as a spring means and second energy accumulator means 40, which is provided in particular as a spring means.

It is provided according to the embodiments according to FIGS. 1-3, that first energy accumulator means 38 comprises plural first energy accumulators 42 in a circumferential direction extending about rotation axis 36, which are in particular arranged at a distance from one another, like, e.g., coil springs or arc springs. It can be provided that all first energy accumulators 42 are configured identically. It can also be provided that differently configured first energy accumulators 42 are provided.

Second energy accumulator means 40 comprises several second energy accumulators 44, respectively, e.g., provided as coil springs or straight compression springs. Thus, in a preferred embodiment, several second energy accumulators 44 are disposed with reference to the circumferential direction of rotation axis 36 at a distance relative to one another. It can be provided that second energy accumulators 44 are respectively provided identical. Different second energy accumulators 44, however, can also be configured differently.

According to the embodiments shown in FIGS. 1-3, second energy accumulator means 40 is disposed with reference to the radial direction of rotation axis 36 radially within first energy accumulator means 38. First energy accumulator means 38 and second energy accumulator means 40 are connected in series. Torsion vibration damper 10 comprises first component 46, which is disposed between first energy accumulator means 38 and second energy accumulator means 40, or connected in series with energy accumulator means 38, 40. Thus, it is provided in particular that when torque converter lockup clutch 14 is closed, torque can be transferred from first energy accumulator means 38 through first component 46 to second energy accumulator means 40. First component 46 can also be designated as intermediary component 46, which is done in the following.

In the embodiments shown in FIGS. 1-3, it is provided that turbine dish 26 is connected to intermediary component 46, so that a load, in particular torque and/or a force can be transferred from turbine dish 26 to intermediary component 46.

Between turbine dish 26 and intermediary component 46, or in the load flow, in particular, in the torque flow, or in the force flow between turbine dish 26 and intermediary component 46, a driver component is provided. It can also be provided that extension 32 also forms intermediary component 46 and/or driver component 50, or takes over their function. It is furthermore provided that along load transfer path 48, through which the load is transferable from turbine dish 26 to intermediary component 46, at least one connection means 52, 56 or 54 is provided. Such a connection means 52, 56, or 54 can, e.g., be a plug-in connection, or a rivet connection or bolt connection 56, as shown in FIGS. 1-3, or weld 52, as shown in FIGS. 1-3, or other similar means. It is appreciated that at the location, where weld 52 is provided, a rivet or bolt connection is drawn additionally in order to show an alternative embodiment. This is also intended to emphasize that the connection means can also be configured differently, or can be combined differently. By means of the respective connection means 52, 54, and, or 56, respective, adjoining components of load transfer path 48 are coupled amongst each other, through which the load can be transferred from turbine dish 26 to intermediary component 46.

It is provided that all connection means 52, 54, and 56, by which components like extension 32 and driver component 50, or driver component 50 and intermediary component 46, are connected along load transfer path 48 between turbine dish 26 and intermediary component 46, are offset from wall section 30 of turbine dish 26, directly abutting to wall interior 28.

Second component 60 and third component 62 are connected in series with first energy accumulator means 38, second energy accumulator means 40, and intermediary component 46, provided between first and second energy accumulator means 38 and 40, respectively. Second component 60 forms an input component of first energy accumulator means 38 and third component 62 forms an output component of second energy accumulator means 40. A load or torque induced by second component 60 into first energy accumulator means 38 can thus be transferred to third component 62 at the output of first energy accumulator means 38 through intermediary component 46 and second energy accumulator means 40.

Third component 62 engages hub 64, forming a non-rotatable connection wherein hub 64, in turn, is non-rotatably coupled to output shaft 66 of torque converter device 1, which is, for example, a transmission input shaft of a motor vehicle transmission. Turbine dish 26 is radially supported at hub 64 by means of support section 68. Support section 68, which is radially supported in particular at hub 64, is substantially sleeve-shaped.

It is provided that the radial support of turbine dish 26 by means of support section 68 is performed, so that support forces acting upon turbine dish 26 are not conducted through first energy accumulator means 38, or through second energy accumulator means 40 from support section 68 to turbine dish 26. Support section 68 is rotatable relative to hub 64. It can be provided that a straight bearing, a straight bearing bushing, a roller bearing, or the like are provided for radial support between hub 64 and support section 68. Furthermore, respective bearings can be provided for axial support. The connection discussed supra between turbine dish 26 and intermediary component 46 is configured so that torque, which is transferable from turbine dish 26 to intermediary component 46, can be transferred by turbine dish 26 to intermediary component 46, without one of first or second energy accumulator means 38 and 40, respectively, being provided along load transfer path 48. The torque transfer from turbine dish 26 to intermediary component 46 through load transfer path 48 can thus be effectuated by means of a substantially rigid connection.

In the embodiments shown in FIGS. 1-3 two respective connection means are provided along load transfer path 48 between turbine dish 26 and intermediary component 46, thus first connection means 52 or 54 and second connection means 56. First connection means 52 or 54 non-rotatably connects extension 32 to driver component 50, and second connection means 56 non-rotatably connects driver component 50 to intermediary component 46. It is appreciated that, with reference to the circumferential direction of rotation axis 36, several distributed first connection means 52 or second connection means 56 can be provided, or are preferably provided.

In the embodiments shown in FIGS. 1-3 sleeve-shaped support portion 68 is an inner portion of driver component 50 with reference to the radial direction of rotation axis 36.

Converter lockup clutch 14 is configured in the embodiments shown in FIGS. 1-3 as a respective multi-disc clutch and comprises first disk carrier 72, by which first disks 74 are non-rotatably received and second disk carrier 76 by which second disks 78 are non-rotatably received. When multi-disc clutch 14 is open, first disk carrier 72 is movable relative to second disk carrier 76, and thus so that first disk carrier 72 can be rotated relative to second disk carrier 76. Second multi-disc carrier 76 is disposed here with reference to the radial direction of axis 36 radially within first disk carrier 72, however, also the opposite can be the case. First disk carrier 72 is attached to converter housing 16. Multi-disc clutch 14 comprises a press component for actuation, which is piston 80 in this case, which is disposed axially movable and can be loaded for actuating the multi-disc clutch 14, for example, hydraulically. Piston 80 is mounted in a rigid or non-rotatable manner to second disk carrier 76, which can be effectuated, for example, by a weld. First disks 74 and second disks 78 alternate in longitudinal direction of rotation axis 36. When loading the multi-disc packet 79, formed by first disk 74 and second disk 78 by piston 80, disk packet 79 is supported at the side of disk packet 79 opposed to piston 80 at a section of the inside of converter housing 16. Between adjacent disks 74 and 78 and on both ends of disk packet 79, friction liners 81 are provided, which are, for example, held at disk 74 and/or 78. Friction liners 81, which are provided at the ends of disk packet 79, can be held on the one side and/or the other side, and also on the inside of converter housing 16 or at piston 80.

In the embodiments shown in FIGS. 1 and 2, piston 80 is configured integrally with the second component, thus the input component of first energy accumulator means 38. In the embodiment shown in FIG. 3, piston 80 is non-rotatably connected or in a solid manner to second component 60 or to the input component of first energy accumulator means 38, wherein the rigid connection is performed here, for example, by a weld. As a matter of principle, the non-rotatable connection can also be performed in another manner. In an alternative configuration of the embodiments shown in FIGS. 1 and 2, the piston and input component 60 of first energy accumulator means 38 can also be configured as separate components, which are connected amongst one another, for example, by a weld or by a rivet or bolt in a rigid or non-rotatable manner. In the embodiment shown in FIG. 3, in order to create a solid or non-rotatable connection instead of the weld, another suitable connection between piston 80 and input component 60 can also be provided, for example, a bolt or a rivet connection, or a plug-in connection, or, alternatively, piston 80 can be integrally manufactured in one piece with input component 60.

The press component or piston 80 or second component 60, and/or first component, or intermediary component 46 and/or third component 62 and/or drive component 50 are preferably formed by a plate. In particular, second component 60, first component 46, and third component 62 each comprises a flange.

In the embodiment shown in FIG. 2, the mass and/or the mass moment of inertia and/or the plate thickness of driver component 50 is greater than the mass moment of inertia, or the mass, or the plate thickness of piston 80, or of input component 60 of first energy accumulator means 38, or of the unit made of components 60 and 80.

For first energy accumulators 42, a type of housing 82 is formed respectively, which extends with reference to the radial direction of rotation axis 36 and with respect to the axial direction of rotation axis 36 at least partially on both sides axially and radially outside about the respective first energy accumulator 42. In the embodiments shown in FIGS. 1-3, housing 82 is disposed at driver component 50. In most applications, the non-rotatable arrangement at driver component 50 is advantageous from a vibration point of view, since more mass or mass moment of inertia is transferred to the secondary side of first energy accumulator means 38.

In the embodiment shown in FIG. 3, first energy accumulators 42 can be respectively supported at housing 82 by means 84 comprising roller elements like balls or rollers, which can also be designated as roller shoe, and which is used for friction reduction. In the embodiments shown in FIGS. 1 and 2, slider dish or slider shoe 94 is provided for friction reduction, through which first energy accumulators 42 can be supported at housing 82.

Furthermore, second rotation angle limiter means 92 is provided in the embodiments shown in FIGS. 1-3 for second energy accumulator means 40, by which the maximum rotation angle, or relative rotation angle of second energy accumulator 40, or of the input component of second energy accumulator means 40 is limited relative to the output component of second energy accumulator means 40. This is performed so that the maximum rotation angle of second energy accumulator means 40 is limited by second rotation angle limiter means 92, so that it is avoided that second energy accumulators 44, which are springs in particular, go into blockage under a respectively high torque load.

Second rotation angle limiter means 92 is configured, as shown in FIGS. 1-3, so that driver component 50 and intermediary component 46 are non-rotatably connected by a bolt, which is, in particular, a component of connection means 56, wherein the bolt extends through a slotted hole, which is provided in the output component of second energy accumulator means 40, or in third component 62. Also, a first rotation angle limiter means for first energy accumulator means 38 can be provided, which is not shown in the figures, by which the maximum rotation angle of first energy accumulator means 38 is limited, so that a blockage loading of first energy accumulators 42, which are, in particular, respectively configured as springs, is avoided. In particular when, which advantageously is the case, second energy accumulators 44 are straight (compression) springs and first energy accumulators 42 are arc springs, it can be provided, that, as shown in FIGS. 1-3, only a second rotation angle limiter means is provided for second energy accumulator means 40, since in such embodiments, in case of a blockage loading, the risk of damages is reduced by arc springs, compared to straight springs, and an additional first rotation angle limiter means would reduce the number of components, or the manufacturing cost.

In a particularly advantageous configuration, it is provided in the embodiments shown in FIGS. 1-3, that the rotation angle of first energy accumulator means 38 is limited to a maximum first rotation angle, and the rotation angle of the second energy accumulator means is limited to a maximum second rotation angle, wherein first energy accumulator means 38 reaches its maximum first rotation angle, when a first threshold torque is applied to first energy accumulator means 38, and wherein second energy accumulator means 40 reaches its maximum second rotation angle, when a second threshold torque is applied to second energy accumulator means 40, wherein the first threshold torque is smaller than the second threshold torque. This can be accomplished in particular by a respective matching of energy accumulator means 38 and 40, or of energy accumulators 42 and 44 of energy accumulator means 38 and 40, possibly, or in particular also by the first and/or second rotation angle limiter means.

It can be provided that first energy accumulators 42 go into blockage at the first threshold torque, so that first energy accumulator means 38 reaches its maximum first rotation angle and that it is effectuated by a second rotation angle limiter means for second energy accumulator means 40 that second energy accumulator means 40 reaches its maximum second rotation angle at a second threshold torque, wherein the maximum second rotation angle is reached, when the second rotation angle limiter means reaches a stop position. This way, in particular a good setting for partial load operation can be achieved.

It is appreciated that the rotation angle of first energy accumulator means 38 or of second energy accumulator means 40, and this applies analogously for the maximum first or the maximum second rotation angle, is the relative rotation angle with reference to the circumferential direction of rotation axis 36 of torsion vibration damper 10, which is provided relative to the unloaded resting position between components directly adjoining the respective energy accumulator means 38 or 40 on the input side and on the output side for a torque transfer. The rotation angle, which is limited in particular in the manner by the respective maximum first or second rotation angle, can change in particular by energy accumulators 42 and/or 44 of the respective energy accumulator means 38 and 40 absorbing energy or releasing stored energy.

In the embodiments shown in FIGS. 1-3, piston 80, the second component, or input component 60 of first energy accumulator means 38 forms several ears 86 distributed about the circumference, each of them comprising non-free end 88 and free end 90, and which are provided for the front face side, input side loading of a respective first energy accumulator 42. Non-free end 88 is thus disposed radially within free end 90 of respective ear 86 with reference to the radial direction of rotation axis 36. By this, it is meant that the non-free end of the ear is disposed radially closer to the axis of rotation than the free end of the ear, as illustrated in FIGS. 1 through 3. In addition, as shown in FIGS. 1 through 3, ear 86 is illustrated as an elongated structure extending from a base structure (e.g., input component 60). By free end, it is meant a portion of the ear which is distal to the base structure. By non-free end, it is meant a portion of the ear which is proximate from the base structure.

The configuration of ears 86 of input component 60 of first energy accumulator means 38 and its respective disposition relative to the respective assigned first energy accumulators 42 and its respective interaction with the respective front face 150 of each respective first energy accumulator 42, is substantially constant and is, therefore, described infra with reference to ear 86 and with reference to a respective first energy accumulator 42, which can be loaded by ear 86, or with reference to its respective front face 150, which can be loaded by ear 86.

Straight connection line 152, extending through free end 90 and through non-free end 88 of ear 86, in particular, respectively in a centric manner, encloses an angle α with straight line 154, extending in a radial direction to rotation axis 36 of torsion vibration damper 10, wherein angle α is less than 70°, or less than 60°, or less than 50°, or less than 40°, or less than 30°, and is approximately 20° in this case, which, in particular, applies to a respective projection into a projection plane, which is established by front face 150 of first energy accumulator 42, which can be loaded by ear 86.

The projection of ear 86 into the projection plane, which is established by front face 150 of first energy accumulator 42, which can be loaded by ear 86, intersects respectively once with outer circumference 156 of front face 150 projected into the projection plane, as shown in FIGS. 1-3, so that projected outer circumference 156 and projected ear 86 form intersection lines in the projection plane, so that first intersection line 160 is formed in the projection plane by ear 86, viewed from its respective non-free end 88 along its extension from non-free end 88 to its free end 90, intersecting along its extension with projected outer circumference 156 for the first time, wherein first intersection line 160 is disposed in the projection plane in a radially inner portion in its entirety with respect to the radial direction of rotation axis 36 of torsion vibration damper 10 of the respective first energy accumulator 42.

However, it can also be provided in an alternative embodiment, that the projected ear 86 intersects the projected outer circumference 156 of front face 150 several times, so that projected outer circumference 156 and projected ear 86 form several intersection lines in the projection plane, wherein first intersection line 160 is formed by ear 86, viewed from its respective non-free end 88 along its extension from non-free end 88 to its respective free end 90, intersecting projected exterior circumference 156 for the first time, wherein first intersection line 160 is disposed in its projection plane in a radially inner portion of first energy accumulator 42 with respect to the radial direction of rotation axis 36 of torsion vibration damper 10, and, thus, completely. For example, the embodiments shown in FIGS. 1-3 in the latter sense can be modified, so that ear 86 in the portion of free end 90 with reference to the radial direction of rotation axis 36 is extended on the radial outside barely beyond outer circumference 156 of front face 150, so that projected ear 86 and projected outer circumference 156 of front face 150 form two intersection lines in the projection plane, and wherein first intersection line 160 is disposed in a projection plane with reference to the radial direction of rotation axis 36 of torsion vibration damper 10 in a radially inward portion of first energy accumulator 42.

According to the embodiments shown in FIGS. 1-3, first intersection line 160, which is illustrated as a projection into the projection plane when viewed in a circumferential direction with respect to front face 150, and which can be loaded by ear 86 of first energy accumulator 42, is disposed with reference to radial direction 36 of torsion vibration damper 10 in a radially inward portion of first energy accumulator 42, so that first intersection line 160 is disposed in the projection plane with reference to the radial direction of rotation axis 36 of torsion vibration damper 10 radially within center force effect line 162 of energy accumulator 42, wherein force effect line 162 is illustrated as a point, and where force effect line 162 intersects the projection plane.

Thus, it is provided that first intersection line 160 is disposed within a portion, which extends symmetrically about radial straight line 154 with reference to the radial direction of rotation axis 36 of torsion vibration damper 10, wherein straight line 154 extends through central force effect line 162, or through the point formed by it in the projection plane, wherein the portion, viewed in a circumferential direction with respect to front face 150 of first energy accumulator 42, covers less than 140°, preferably less than 120°, preferably less than 100°, and, as shown in FIGS. 1-3, as indicated by the angle β, covers approximately 90°.

Ear 86 is configured straight in portion 164 adjoining to free end 90. This is configured so that ear 86 in portion 164 extends substantially in radial direction with reference to the radial direction of rotation axis 36.

It can be provided that first energy accumulator 42 is configured as an arc spring or as a coil spring and that its respective front face 150, which can be loaded by ear 86, is formed by an end side or face side spring winding. In particular, in such an embodiment, it can be provided that ear 86 can load front face 150 at two locations offset in a circumferential direction with respect to front face 150, which are offset from one another in the circumferential direction by at least 100°, preferably by at least 110°, and most preferably by at least 120°. This offset amounts to almost 130° according to FIGS. 1-3.

It can be provided, that caps are applied on the end sides to first energy accumulators 42, so that the respective ear 86 loads the respective front face of first energy accumulator 42 by means of such a cap.

As stated supra, according to DE 103 58 901 A1 the actuation elements extend from the radial outside, or from the above, or from the side to the respective front face of the respective energy accumulator of the outer energy accumulator means. Accordingly, it can be said that according to the embodiments of the invention, the control elements or ears 86 extend from the radial inside or from below to the respective front face of the respective first energy accumulator 42 of the outer or first energy accumulator means 38, or from below, or from the radial inside into the respective first energy accumulator 42 of the outer or first energy accumulator means 38.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

Designations
1 hydrodynamic torque converter device
2 motor vehicle drive train
10 torsion vibration damper
12 converter torus formed by 10, 22, 24
14 converter lockup clutch
16 converter housing
18 drive shaft like, e.g., engine output shaft of a combustion engine
20 pump or pump shell
22 stator shell
24 turbine or turbine shell
26 turbine dish
28 converter interior
30 wall section of 26
32 extension of 26 at 30
34 straight section of 32 or ring disk shaped section of 32
36 rotation axis of 10
38 first energy accumulator means
40 second energy accumulator means
42 first energy accumulator
44 second energy accumulator
46 first component of 10 or intermediary component
48 load transfer path
50 driver component
52 connection means or weld between 32 and 50 in 48
54 connection means or bolt or rivet connection between 32 and 50 in 48
56 connection means or bolt or rivet joint between 50 and 46 in 48
60 second component, input component of 38
62 third component
64 hub
66 output shaft, transmission input shaft
68 support section
72 first disk carrier of 14
74 first disk of 14
76 second disk carrier of 14
78 second disk of 14
79 disk packet of 14
80 piston for actuation of 14
81 friction liner of 14
82 housing
84 roller shoe
86 ear
88 non-free end of 82
90 free end of 82
92 second rotation angle limiter means 92 of 40
94 slider shoe
150 front face of 42 loadable by 86
152 straight connection line extending through 90 and 88
154 straight line aligned in radial direction relative to 36
156 outer circumference of 150
158 intersection line of projected 86 and projected 150
160 first intersection line
162 force effect line of 42
164 portion of 86 adjoining to 90
α angle between 152 and 154
β angle defining the portion, in which 160 is disposed

What is claimed is:

1. A hydrodynamic torque converter device for a motor vehicle drive train comprising:
a torsion vibration damper comprising: a rotation axis; a first energy accumulator means, the first energy accumulator means including at least one first energy accumulator having a front face and an input component including at least one ear having a free end and a non-free end; and, a second energy accumulator means including at least one second energy accumulator;
at least one intermediary component arranged between, and serially connected with, the first energy accumulator means and the second energy accumulator means;
a converter torus comprising: a pump shell; a turbine shell including an outer turbine dish non-rotatably connected to the at least one intermediary component; and, a stator shell; and,
a converter lockup clutch having at least a closed position, wherein the converter lockup clutch, the first energy accumulator means, the at least one intermediary component, and the second energy accumulator means are serially connected, wherein the outer turbine dish is non-rotatably connected to the intermediary component, wherein the input component is arranged to transfer torque through the converter lockup clutch, when the converter lockup clutch is in the closed position, for loading the first energy accumulator means, and wherein the non-free end of the at least one ear is disposed radially within the free end, with reference to the radial direction of the rotation axis, wherein a press component is arranged for loading the lockup clutch and for closing the lockup clutch, the press component and the input component of the first energy accumulator means being formed of a single piece of material, the input component extending from an outer periphery of the press component.

2. The hydrodynamic torque converter device recited in claim 1, wherein the first energy accumulator means is arranged for loading the at least one first energy accumulator, wherein the free end and the non-free end of the at least one ear are arranged such that a straight connection line extends through the free end and the non-free end and encloses an angle with a straight line extending radially with respect to the rotation axis, and wherein the angle is less than 70°.

3. The hydrodynamic torque converter device recited in claim 2, further comprising a projection plane defined by the front face, wherein the front face includes an outer circumference, wherein the at least one ear extends into the projection plane and intersects the outer circumference at least once, such that the outer circumference and the at least one ear form at least a first intersection line in the projection plane, wherein the at least first intersection line is formed in the projection plane by the at least one ear when viewed from the non-free end toward the free end, and wherein the at least first intersection line is disposed in the projection plane in a radially interior portion of the at least one first energy accumulator, with reference to the radial direction of the rotation axis.

4. The hydrodynamic torque converter device recited in claim 3, wherein the first intersection line is disposed with reference to the radial direction of the rotation axis in the radially interior portion of the respective first energy accumulator, wherein the first intersection line is disposed in the projection plane with reference to the radial direction of the rotation axis radially within a center force effect line of the first energy accumulator, or of the point at which the center force effect line intersects the projection plane and within a portion which extends symmetrically about the radial straight line, which extends through the central force effect line, or a point formed by the center force effect line in the projection plane, and wherein the portion covers a maximum of 140° in circumferential direction of the front face.

5. The hydrodynamic torque converter device recited in claim 3, wherein the at least one ear forms a respective intersection surface or intersection line with the front face, wherein the respective intersection surface or intersection line is formed by the at least one ear projecting onto the front face in portions of the front face disposed with reference to the radial direction of the front face and extending on the radial outside beyond the outer circumference of the front face.

6. The hydrodynamic torque converter device recited in claim 1, wherein the at least one ear is arranged straight in a portion thereof that adjoins the free end, wherein the portion extends substantially in the radial direction with reference to the axis of rotation.

7. The hydrodynamic torque converter device recited in claim 1, wherein the torque converter lockup clutch comprises a multi-disk clutch.

8. The hydrodynamic torque converter device recited in claim 1, wherein the torque converter lockup clutch comprises a multi-disk clutch, wherein the multi-disk clutch comprises a first disk carrier, by which at least one first disk is received, and a second disk carrier, by which at least one second disk is received, and wherein a disk packet is formed by the at least one first disk and the at least one second disk, wherein the press component comprises a piston which is supported axially movable and is hydraulically actuatable, wherein the press component forms the at least one second disk and is non-rotatably coupled therewith.

9. The hydrodynamic torque converter device recited in claim 8 further comprising a driver component comprising a plate having a thickness, wherein the input component comprises a plate having a thickness, wherein the outer turbine dish is non-rotatably connected to the intermediary component by means of the driver component, wherein a mass moment of inertia of the driver component is greater than a mass moment of inertia of the input component or the plate thickness of the driver component, is greater than the plate thickness of the input component, of the at least first energy accumulator means or of the press component.

* * * * *